(12) United States Patent
Kim et al.

(10) Patent No.: US 8,556,238 B2
(45) Date of Patent: *Oct. 15, 2013

(54) DIFFUSER FOR AERATION

(75) Inventors: Jinho Kim, Yongin-Si (KR); Minsoo Park, Yangcheon-Gu (KR); Jiwoong Lee, Yongin-Si (KR)

(73) Assignee: Econity Co., Ltd., Yongin (KR)

( * ) Notice: Subject to any disclaimer, the term of this patent is extended or adjusted under 35 U.S.C. 154(b) by 416 days.

This patent is subject to a terminal disclaimer.

(21) Appl. No.: 12/941,654

(22) Filed: Nov. 8, 2010

(65) Prior Publication Data

US 2011/0101548 A1    May 5, 2011

Related U.S. Application Data

(63) Continuation-in-part of application No. 12/282,666, filed as application No. PCT/KR2007/006955 on Dec. 28, 2007, now Pat. No. 7,850,151.

(30) Foreign Application Priority Data

Dec. 29, 2006 (KR) .................. 10-2006-0138016
Nov. 27, 2009 (KR) .................. 10-2009-0115547

(51) Int. Cl.
*B01F 3/04* (2006.01)

(52) U.S. Cl.
USPC .......................................... 261/124

(58) Field of Classification Search
USPC ............ 261/122.1, 122.2, 123, 124, DIG. 47; 210/150, 151, 221.2
See application file for complete search history.

(56) References Cited

U.S. PATENT DOCUMENTS

| 950,825 | A | * | 3/1910 | Pill .................................. 261/70 |
| 1,250,303 | A | * | 12/1917 | Greenawalt ................... 209/170 |
| 3,662,781 | A | * | 5/1972 | Figliola et al. ........... 137/543.17 |
| 4,086,308 | A | * | 4/1978 | Jurgens et al. ................ 261/124 |
| 4,571,326 | A | * | 2/1986 | Bischoff et al. .............. 422/207 |
| 4,639,354 | A | * | 1/1987 | Bischoff et al. .............. 422/140 |
| 4,655,242 | A | * | 4/1987 | Hamazaki et al. ........ 137/247.27 |
| 4,734,191 | A | * | 3/1988 | Schussler ...................... 210/220 |
| 4,941,896 | A | * | 7/1990 | Gustavsson et al. ............ 95/226 |
| 5,032,325 | A | * | 7/1991 | Tharp ........................... 261/124 |

(Continued)

FOREIGN PATENT DOCUMENTS

| DE | 4337091 A1 | 5/1995 |
| EP | 0346109 A1 | 12/1989 |

(Continued)

OTHER PUBLICATIONS

International Search Report for International Application No. PCT/KR/2007/006955 dated Apr. 10, 2008.*

(Continued)

*Primary Examiner* — Richard L Chiesa
(74) *Attorney, Agent, or Firm* — Edwards Wildman Palmer LLP

(57) ABSTRACT

Disclosed is a diffuser installation structure capable of improving uniformity of air bubbles discharged from air bubble discharge holes, restricting the formation of dead zone air bubble discharge holes, and having the tolerance against design deviation. In the installation structure for a diffuser including at least one air feeding port and an air bubble discharge wall having a plurality of air bubble discharge holes, the air bubble discharge wall is inclined upward in the direction of increasing distance relative to the air feeding port.

1 Claim, 11 Drawing Sheets

(56) References Cited

U.S. PATENT DOCUMENTS

| | | | |
|---|---|---|---|
| 7,850,151 B2 * | 12/2010 | Kim et al. | 261/124 |
| 8,191,871 B2 * | 6/2012 | Kim et al. | 261/124 |
| 2003/0006512 A1 * | 1/2003 | Kelly | 261/122.1 |
| 2009/0051057 A1 * | 2/2009 | Kim et al. | 261/121.1 |
| 2011/0133348 A1 * | 6/2011 | Kim et al. | 261/124 |

FOREIGN PATENT DOCUMENTS

| | | | | |
|---|---|---|---|---|
| JP | 53-25272 A | * | 3/1978 | 261/124 |
| JP | 55-171393 A | * | 10/1983 | |
| JP | 58-177198 A | * | 10/1983 | |
| KR | 1020050112555 | * | 12/2005 | |
| WO | 9845030 A1 | | 10/1998 | |

OTHER PUBLICATIONS

Supplemental European Search Report for European Application No. 07860739.7, dated Feb. 20, 2012.

* cited by examiner (a)

(b)

(c)

DIFFUSER FOR AERATION

CROSS-REFERENCE TO RELATED APPLICATION

This application claims, pursuant to 35 U.S.C. §119(a), the benefit of Korean Application No. 10-2009-0115547 filed on Nov. 27, 2009 and is a continuation-in-part of U.S. application Ser. No. 12/282,666 filed on Sep. 12, 2008, now U.S. Pat. No. 7,850,151, which is U.S. national phase application, pursuant to 35 U.S.C. §371, of PCT/KR2007/006955 filed on Dec. 28, 2007, which claims priority of Korean Application No. 10-2006-0138016 filed on Dec. 29, 2006. The entire contents of the aforementioned applications are incorporated herein by reference.

TECHNICAL FIELD

The present invention relates to a diffuser for aeration. A diffuser for aeration is an apparatus for generating a plurality of air bubbles under water, and comprises an air intake passage and air bubble discharge holes. The diffuser for aeration is used to generate air bubbles, for instance, in the aeration tank of a water treatment facility, in the filtration tank of a water treatment facility using filtration, and in the bio-reactor of a water treatment facility using a membrane bio-reactor (MBR).

BACKGROUND ART

The aeration tank is used to decompose organic substances contained in dirty water, wastewater and sewage by cultivating aerobic microorganisms. The diffuser for aeration, which is fluid-communicated with a blower, is installed on the bottom of the aeration tank. The wastewater in the aeration tank is supplied with oxygen through air bubbles discharged from the diffuser for aeration. This oxygen is used to cultivate the aerobic microorganisms contained in the wastewater.

The filtration tank is used to eliminate solid particles contained in the wastewater through a filtration process. The filter tank is provided with a filtering unit such as, for instance, a submerged membrane filter module. The diffuser for aeration, which is fluid-communicated with the blower, is installed below the submerged membrane filter module in the filtration tank. The air bubbles discharged from the diffuser for aeration disturb water around the submerged membrane filter module. The membrane is subject to vibration due to "collision with the air bubbles" and "water disturbance around the membrane", so that fouling phenomenon (micropores of the membrane are blocked by deposition of the solid particles) can be prevented.

In the bio-reactor, the solid particles are eliminated by the membrane module, and simultaneously, the organic substances are decomposed by the microorganisms. The air bubbles discharged from the diffuser for aeration installed on the bottom of the bio-reactor prevents the fouling of the membrane while supplying oxygen to the microorganisms.

The air bubbles discharged from the diffuser for aeration can be classified into micro air bubbles and macro air bubbles according to a diameter thereof. Typically, the air bubbles having a diameter from about 1 mm to about 3 mm are called micro air bubbles. The size of each discharged air bubble depends on a diameter of each air-bubble discharge hole. In general, the diameter of the air bubble is greater than the diameter of the air-bubble discharge hole. The micro air bubbles have an advantage in that they have high efficiency of transmitting the oxygen to the water. However, in order to increase physical cleaning effects of the air bubbles, it is advantageous to increase the size of the air bubbles discharged from the diffuser for aeration. For example, in the diffuser for aeration used for a membrane bio-reactor (MBR), the diameter of each air bubble discharge hole is typically designed within a range from about 1 mm to about 10 mm, and more frequently, within a range from about 3 mm to about 8 mm, by taking oxygen transmission effects and cleaning effects into consideration.

In the filter tank and the bio-reactor, the prevention of membrane fouling by the air bubbles discharged from the diffuser for aeration is called "physical cleaning of the membrane by the air bubbles". With regard to the physical cleaning of the membrane by the air bubbles, the most fatal factor is the formation of a dead zone where a disturbance degree of the water is extremely low. In particular, in the case of the bio-reactor operating with high concentration microorganisms, if the dead zone is formed in the vicinity of the membrane, the surface blockade of the membrane may rapidly proceed due to sticky solid particles of microorganisms, and, pressure applied to the membrane may rapidly increase.

The dead zone is formed around the membrane mainly because the amount of air bubbles discharged from air bubble discharge holes of the diffuser for aeration is not uniform. This phenomenon is called "non-uniform aeration". If the discharge amount of the air bubbles that serve as driving force for disturbing water is not uniform, the dead zone where a disturbance degree of the water is extremely low may be formed in the vicinity of the membrane.

FIG. 1 is a perspective view showing the conventional diffuser installation structure in which a membrane module fixing frame is integrally formed with a diffuser for aeration. The diffuser 100 for aeration, which is in the form of a rectangular pipe having a substantially U-shaped structure, is attached to a lower end portion of the frame 400. Air is fed into the diffuser 100 for aeration through an air feeding pipe 300. The membrane module is not shown in FIG. 1. The diffuser 100 for aeration is provided with a plurality of air bubble discharge holes which are directed upward. The frame 400 is installed in a filter tank while keeping the diffuser 100 for aeration in a horizontal state. If the amount of air bubbles discharged from some of air bubble discharge holes formed in the diffuser 100 for aeration is relatively small, the dead zone may be formed in the vicinity of the membrane module positioned above the corresponding air bubble discharge holes.

Hereinafter, the non-uniform aeration phenomenon occurred in the diffuser 100 for aeration will be described in detail with reference to FIG. 2. FIG. 2 is an enlarged sectional view showing a part of the diffuser 100 for aeration illustrated in FIG. 1. The diffuser 100 for aeration is provided with a plurality of air bubble discharge holes 111, 112, 113, 114 and 115 which are directed upward. The airflow is indicated by arrows. The amount of air bubbles discharged from each air bubble discharge hole is indicated by the height of the vertical arrows. In the diffuser 100 for aeration, a region located above the dotted line is an air layer and a region located below the dotted line is a water layer. In general, since air-flow resistance increases proportionally to the distance relative to an air feeding port 101, the thickness of the air layer in the diffuser 100 for aeration becomes reduced proportionally to the distance relative to the air feeding port 101.

In the case of the submerged membrane system, typically, the diffuser for aeration capable of discharging macro air bubbles having a diameter of about 5 mm or above is preferred. However, as the diameter of the air bubble discharge holes 111, 112, 113, 114 and 115 becomes enlarged, the pressure difference related to the airflow is reduced at each air bubble discharge hole, so that air is concentrated on the air bubble discharge holes (for instance, 111 and 112), which are closest to the air feeding port 101. In an extreme case, air bubbles may not be discharged from the air bubble discharge hole (for instance, 115) located far away from the air feeding port 101. As a result, the dead zone may be formed above the air bubble discharge holes (for instance, 113 and 114) through which a relatively smaller amount of air bubbles are discharged, and especially, above the air bubble discharge hole 115 that does not discharge air bubbles.

The air bubble discharge holes (for instance, 113 and 114) through which a relatively smaller amount of air bubbles is discharged and the air bubble discharge hole 115 that does not discharge air bubbles are called "dead zone air bubble discharge holes". One of important factors in operation of the water treatment facility is to reduce the number of the dead zone air bubble discharge holes.

In order to reduce the number of the dead zone air bubble discharge holes, there has been suggested a method of increasing the amount of air introduced into the air feeding port 101. If the amount of air fed into the air feeding port 101 is increased (although the amount of air bubbles discharged from the air bubble discharge hole closest to the air feeding port will be more increased), the air bubble discharge holes located far away from the air feeding port 101 may avoid being the "dead zone air bubble discharge holes".

However, if the amount of air introduced into the air feeding port increases, the blower is subject to great load, the membrane is damaged due to the excessive discharge of air bubbles, and the operation cost for the water treatment facility is increased. In contrast, if it is possible to reduce the feed amount of air while reducing the number of the dead zone air bubble discharge holes, the operation cost can be saved.

Another method has been suggested to reduce the number of dead zone air bubble discharge holes. According to this method, the size of the air bubble discharge hole is adjusted while keeping the diffuser for aeration in a horizontal state. However, in this case, the non-uniform aeration phenomenon may not be sufficiently prevented. In addition, it is frequently necessary to set the diameter of the air bubble discharge holes, which are located adjacent to the air feeding port, to be smaller than the diameter required for physical cleaning.

In order to reduce the number of the dead zone air bubble discharge holes, there has been suggested another method of heightening the position of air bubble discharge holes formed in the diffuser for aeration such that the air bubble discharge holes have a higher position proportionally to the distance relative to the air feeding port, while keeping the diffuser for aeration in a horizontal state. However, in this case, the thickness of a region filled only with water may increase at a lower portion of the distal end of the diffuser for aeration. The water remaining in the above region may stagnate because it does not receive shear force of air-flow. Thus, as time goes by, sludge is deposited, resulting in blockage of the air bubble discharge holes.

The further serious problem related to the diffuser for aeration is that most diffusers for aeration are designed under the condition that the diffusers for aeration are kept in the horizontal state. That is, under the precondition that the diffusers for aeration are kept in the horizontal state, the amount of air fed into the diffuser for aeration, the size of the air bubble discharge hole, and the position of the air bubble discharge hole are determined so that the non-uniform aeration phenomenon can be reduced.

However, in this case, when the diffuser for aeration is actually installed in the water treatment facility, if the diffuser for aeration is not precisely kept in the horizontal state, the diffuser for aeration does not achieve its intended design purpose, so that the non-uniform aeration may seriously occur. FIG. 3 is a view showing the diffuser for aeration which is not kept in the horizontal state. Since the diffuser 100 for aeration is not kept in the horizontal state, the distal end of the diffuser for aeration, which is located far away from the air feeding port 101, is sagged downward. Accordingly, the air layer, which is located above the dotted line, may not extend to the air bubble discharge holes 113, 114 and 115, and, the air bubble discharge holes 113, 114 and 115 are immersed in the water layer. As a result, the air bubble discharge holes 113, 114 and 115 cannot discharge air bubbles, thus, the air bubble discharge holes 113, 114 and 115 become dead zone bubble discharge holes.

Actually, in the diffuser system for aeration, which is integrally formed with a membrane module mounting frame, it is difficult to horizontally install the frame in the filter tank. In addition, even if the diffuser for aeration is provided separately from the frame, since it is difficult to horizontally maintain the diffuser for aeration on the bottom of the filter tank, the non-uniform aeration frequently occurs in the diffuser for aeration. Such a non-uniform aeration phenomenon can be relieved by increasing the amount of air fed into the diffuser for aeration, but this may cause the above-mentioned problems.

There are various attempts in the world to restrict the non-uniform aeration phenomenon of the diffuser of aeration. However, these attempts lead to the complex structure of the diffuser for aeration. Such a complex structure of the diffuser for aeration may increase the manufacturing cost of the diffuser for aeration and the installation cost of the water treatment facility.

SUMMARY OF THE DISCLOSURE

The present invention provides a diffuser installation structure having a simple structure, in which air bubbles can be uniformly discharged from a plurality of air bubble discharge holes, thereby preventing formation of dead zone air bubble discharge holes, and in which the non-uniform aeration phenomenon does not occur even if a diffuser for aeration is not kept in the horizontal state, that is, the installation structure has a tolerance for deviation from the horizontal position of the diffuser for aeration (in other words, the installation structure has a tolerance against deviation from design).

In addition, the present invention provides a diffuser module for aeration capable of uniformly distributing air into diffusers which are fluid-communicated with air outlet ports of a manifold.

In order to achieve the above object, according to one aspect of the present invention, there is provided an installation structure for a diffuser for aeration comprising at least one air feeding port and an air bubble discharge wall having a plurality of air bubble discharge holes, wherein the air bubble discharge wall is inclined upward in the direction of increasing distance relative to the air feeding port.

The most important feature in the installation structure of a diffuser for aeration (hereinafter, simply referred to as a diffuser) is that an air bubble discharge wall is inclined upward in the direction of increasing distance relative to an air feeding port. Here, the term "air bubble discharge wall" refers to the minimal part of the wall structure forming the diffuser, which contains air bubble discharge holes.

Due to the above feature of the present invention, when the diffuser installation structure of the present invention is used for aeration, an air layer formed in the diffuser extends easily to the diffuser's end which is located far away from the air feeding port (hereinafter, simply referred to as a distal end of the diffuser). Thus, even if a relatively smaller amount of air is fed into the diffuser, the air bubble discharge holes in adjacent to the distal end of the diffuser can discharge air bubbles sufficient for preventing the formation of dead zone. In addition, the air bubbles can be uniformly discharged from all the plural air bubble discharge holes.

Furthermore, in the case that the diffuser of the present invention can be applied to the water treatment facility, even if the actual inclination angle of the air bubble discharge wall on the basis of the horizontal plane slightly deviates from the designed inclination angle, (if the deviation angle is smaller than the designed inclination angle), the air bubble discharge wall still maintains the upward-inclination in the direction of increasing distance relative to the air feeding port. Therefore, the serious non-uniform aeration which is occurred in conventional diffusers which are not kept in the horizontal state, can be prevented or restricted in the present invention. Thus, the formation of the dead zone air bubble discharge holes can be still prevented in the present invention. That is, the diffuser according to the present invention has the superior tolerance against deviation from design.

In another aspect, the present invention provides a diffuser module comprising: a tube manifold having at least one air intake port and a plurality of air outlet ports which are intermittently formed in an air flow direction, the tube manifold being inclined upward relative to a horizontal plane in the air flow direction; and a plurality of diffusers which are fluid-communicated with the air outlet ports of the manifold, wherein the diffusers each include: an air bubble discharge pipe comprising an air feeding port; and an air bubble discharge wall having a plurality of air bubble discharge holes, the air bubble discharge wall being inclined upward in the direction of increasing distance relative to the air feeding port; and a sludge discharge pipe which is installed at a distal end of the air bubble discharge pipe, the sludge discharge pipe extending downward.

DETAILED DESCRIPTION OF THE DISCLOSURE

Figure 4:
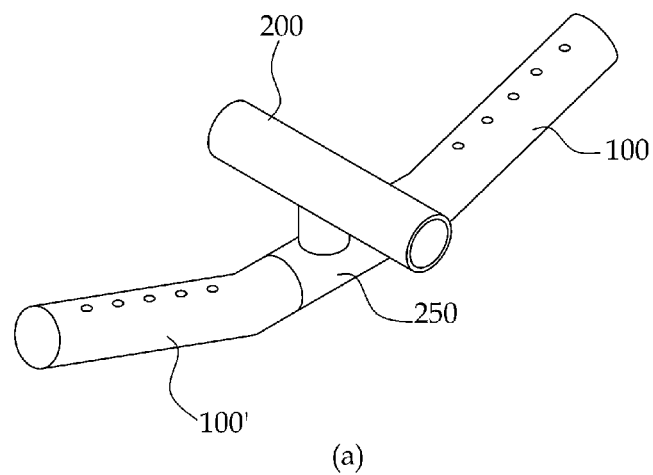
FIGS. 4a-c are perspective views showing a diffuser installation structure according to an embodiment of the present invention.
Figure 4:
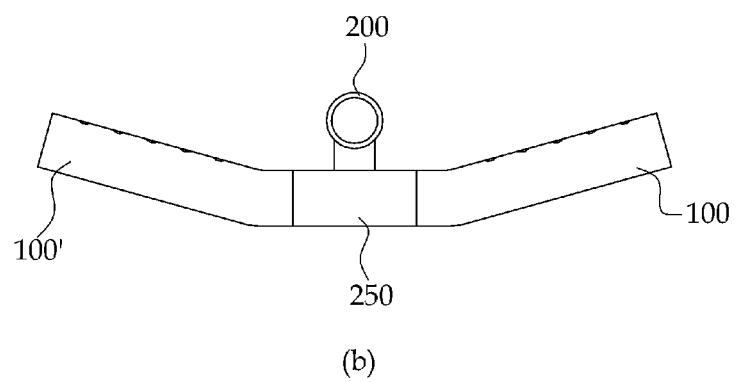
Figure 4:
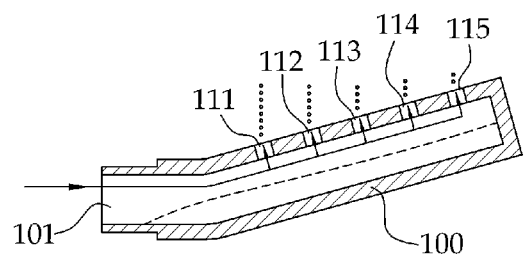

FIG. 4 is a perspective view showing a diffuser installation structure according to an embodiment of the present invention. FIG. 4 (a) is a perspective view showing diffusers that are fluid-communicated with an air feeding pipe. Two diffusers 100 and 100' in the form of a tube are connected to the air feeding pipe 200 through a fluid connection member 250. That is, the two diffusers 100 and 100' constitute a diffuser pair, in which the two diffusers 100 and 100' are symmetrically disposed about the fluid connection member 250. A plurality of air bubble discharge holes are formed at an upper portion of the diffusers 100 and 100'.

FIG. 4 (b) is a front view showing diffusers that are fluid-communicated with the air feeding pipe. The diffusers 100 and 100' are symmetrically disposed about the fluid connection member 250 and are inclined upward in the direction of the distal end of the diffuser. Thus, in the upper surface of the diffuser, an air bubble discharge wall including a region where the air bubble discharge holes are formed, is also inclined upward in the direction of increasing distance relative to the fluid connection member 250.

FIG. 4 (c) is a sectional view showing the diffuser which is installed at the right side of the fluid connection member 250 in FIG. 4 (b). A plurality of air bubble discharge holes 111, 112, 113, 114 and 115 are formed in the upper surface of the diffuser 100. During the aeration, air is fed into the diffuser 100 through an air feeding port 101, so that air bubbles are discharged through the air bubble discharge holes 111, 112, 113, 114 and 115. The air flow in the diffuser 100 is indicated by an arrow. In the diffuser 100, the region located above the dotted line is an air layer and the region located below the dotted line is a water layer. The upper portion of the diffuser 100 where the air bubble discharge holes 111, 112, 113, 114 and 115 are formed, that is, the air bubble discharge wall is inclined upward in the direction of increasing distance relative to the air feeding port 101. When forming the air layer in the above structure, the buoyancy applied to the air layer may become an important factor in addition to the amount of air fed into the diffuser. That is, due to the buoyancy applied to the air layer by the water layer, the air layer in the diffuser 100 (the region above the dotted line) may spontaneously and easily extend to the distal end of the diffuser 100. Such an air layer may have uniform thickness over the whole area of the air bubble discharge wall. Thus, the air bubbles can be uniformly discharged from the air bubble discharge holes 111, 112, 113, 114 and 115. Since the air layer readily extends to the distal end of the diffuser 100, even if a relatively smaller amount of air is fed through the air feeding port 101, the formation of dead zone air bubble discharge holes, which do not discharge air bubbles or discharge air bubbles insufficient for physical cleaning, can be completely prevented or extremely restricted.

Figure 5:
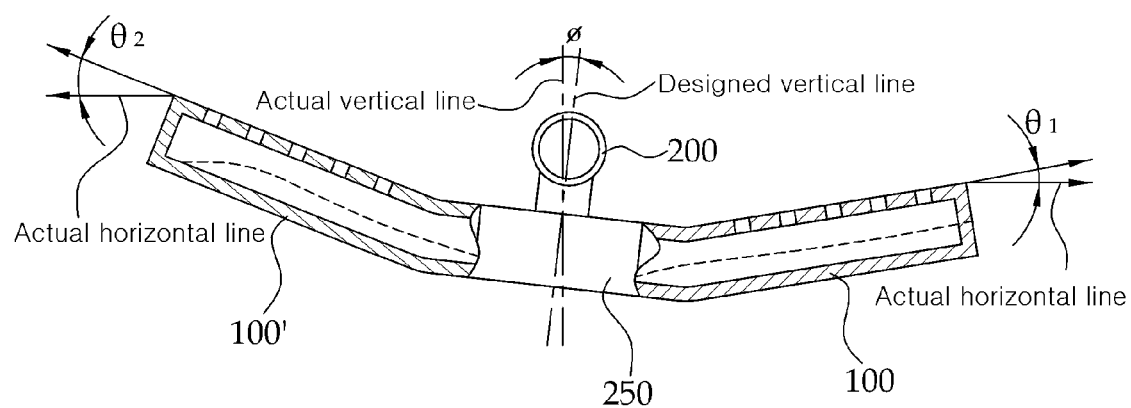
FIG. 5 is a partially sectional view illustrating the diffuser for aeration shown in FIG. 4 that deviates from the original design.

FIG. 5 is a partially sectional view illustrating the diffuser of FIG. 4, that is installed with deviation from the original design. In FIG. 5, a diffuser module having an air feeding pipe 200, a fluid connection member 250 and two tube type diffusers 100 and 100' which are symmetrically disposed, is installed in such a manner that the designed vertical line deviates from the actual vertical line, in the right-side direction by an angle of P. Accordingly, the upward-inclination angle $\theta_1$ of the air bubble discharge wall of the right-side diffuser 100 relative to the actual horizontal line is smaller than the upward-inclination angle $\theta_2$ of the air bubble discharge wall of the left-side diffuser 100' relative to the actual horizontal line (In FIG. 5, if the designed vertical line is identical to the actual vertical line, $\theta_1$ equals to $\theta_2$). However, in this case, if the deviation angle $\Phi$ is smaller than the designed upward-inclination angle $\theta_1$ of the air bubble discharge wall of the right diffuser 100 relative to the horizontal line, the air bubble discharge wall of the right-side diffuser 100 (as well as the air bubble discharge wall of the left-side diffuser 100') can still maintain the upward-inclination. Therefore, as indicated by the dotted line, the air layer formed in the right-side diffuser 100 can easily extend to the distal end of the diffuser 100. That is, the diffuser according to the present invention has a tolerance against deviation from design as long as the deviation angle $\Phi$ is smaller than the designed upward-inclination angle of the air bubble discharge wall of the diffuser relative to the horizontal line. Therefore, the serious non-uniform aeration, which is occurred due to the deviation from design (that is, deviation from the horizontal state) in conventional diffusers, can be completely prevented or extremely restricted in the present invention. Thus, the formation of the dead zone air bubble discharge holes can be prevented.

In the diffuser installation structure according to the present invention, the air bubble discharge wall may be inclined upward by a fixed inclination angle in the direction of increasing distance relative to the air feeding port. In this case, the air bubble discharge wall extends straightly from the air feeding port. The upward-inclination angle of the air bubble discharge wall is not limited to a specific value. However, if the upward-inclination angle of the air bubble discharge wall is too small, the upward-inclination effect of the air bubble discharge wall is too low. In contrast, if the upward-inclination angle of the air bubble discharge wall is too large, the air bubbles are excessively concentrated on the diffuser's distal end which climbs steeply. In this regard, preferably, the upward-inclination angle of the air bubble discharge wall may be about 3° to about 10°. More preferably, the upward-inclination angle of the air bubble discharge wall may be about 7°. Most preferably, the upward-inclination angle of the air bubble discharge wall may be set in such a manner that the amount of air bubbles discharged from the air bubble discharge hole, which is closest to the air feeding port, is substantially identical to the amount of air bubbles discharged from the air bubble discharge hole located farmost away from the air feeding port.

In the diffuser installation structure according to the present invention, the air bubble discharge wall is inclined upward with gradually increasing inclination angle proportionally to distance relative to the air feeding port. In this case, the air bubble discharge wall may have a curved structure of, for example, a circular arc, an ellipse arc, or a parabola.

As shown in FIGS. 4 and 5, the diffuser of the present invention has a circular-tube structure. However, the diffuser of the present invention may have various geometrical configurations. For instance, the diffuser may have a hexahedral structure having a rectangular sectional shape.

Although, in FIGS. 4 and 5, the fluid-communication between the pair of diffusers and the air feeding pipe is achieved through the fluid connection member 250, this is illustrative purposes only. For instance, the pair of diffusers can be directly attached to both sides of the air feeding pipe through welding, bonding, screw coupling, sleeve coupling or flange coupling. In addition, even when the pair of diffusers are connected to the air feeding pipe through a fluid connection member, the shape of the fluid connection member can be variously modified from the shape of the fluid connection member 250 shown in FIGS. 4 and 5.

According to another aspect of the present invention, there is provided a diffuser module comprising: a tube type manifold having at least one air intake port and a plurality of air outlet ports which are intermittently formed in an air flow direction; and a plurality of diffusers which are fluid-communicated with the air outlet ports of the manifold, wherein the manifold is inclined upward relative to a horizontal plane in the air flow direction.

According to the diffuser module of the present invention, the manifold that serves to distribute air to the diffusers is inclined upward relative to a horizontal plane in the air flow direction. As a result, air can be uniformly distributed into the diffusers which are fluid-communicated with the air outlet ports of the manifold. Therefore, the diffuser module of the present invention can prevent the occurrence of dead zone diffuser. Here, the term "dead zone diffuser" refers to a diffuser that discharges air bubbles significantly less than air bubbles discharged from any other diffuser which is fluid-communicated with the manifold.

Figure 6:
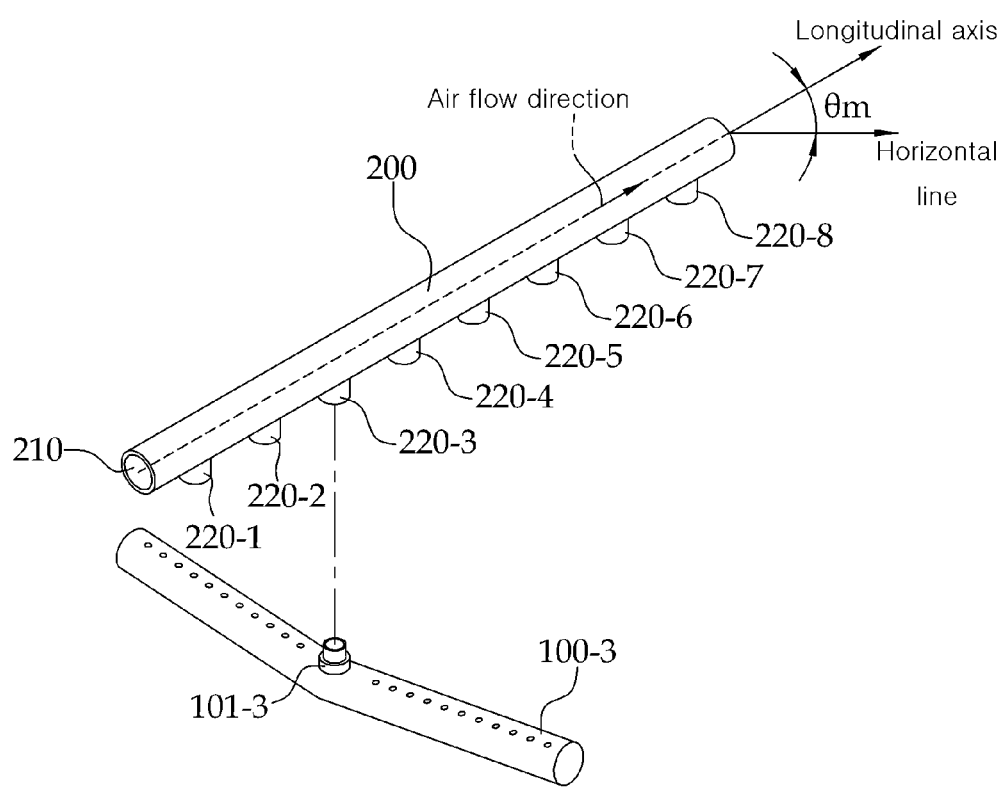
FIG. 6 is an exploded perspective view illustrating a diffuser module for aeration according to an embodiment of the present invention.

FIG. 6 is an exploded perspective view illustrating the diffuser module according to an embodiment of the present invention. An air intake port 210 and eight air outlet ports 220-1, 220-2, 220-3, 220-4, 220-5, 220-6, 220-7, and 220-8 are formed in a circular tube type manifold 200. The eight air outlet ports are formed downward from the bottom of the manifold 200 and are sequentially disposed at a predetermined interval in the air flow direction indicated by the dotted arrow. The diffusers are connected with the air outlet ports of the manifold 200 for fluid communication. For instance, a diffuser 100-3 is connected with the air outlet port 220-3 of the manifold 200. Although the remaining diffusers are also connected with other air outlet ports 220-1, 220-2, 220-4, 220-5, 220-6, 220-7, and 220-8, they are omitted in FIG. 6 for the purpose of simplicity. The fluid-communication between the air outlet port 220-3 of the manifold 200 and the diffuser 100-3 is achieved through sleeve coupling between a sleeve formed on the air outlet port 220-3 and a sleeve formed on the air feeding port 101-3. Although FIG. 6 shows the sleeve coupling for achieving fluid-communication between the air discharge port of the manifold and the air feeding port of the diffuser, such fluid-communication can be achieved through other various means. The main point is that the manifold 200 is inclined upward relative to a horizontal plane in the air flow direction indicated by the dotted arrow. Accordingly, the central longitudinal axis of the manifold 200 forms an upward angle $\theta m$ relative to the horizontal plane in the air flow direction. That is, the distal end of the manifold 200 located away from the air intake port 210 is inclined upward relative to the air intake port 210. Due to the upward-inclination of the manifold 200, the air feed amount from the air outlet ports 220-1, 220-2, 220-3, 220-4, 220-5, 220-6, 220-7, and 220-8 to the corresponding diffusers can be uniformly distributed.

According to the diffuser module of the present invention, the manifold is inclined upward in the air flow direction relative to the horizontal plane by a fixed inclination angle. In this case, the upward-inclination angle of the manifold is not limited to a specific value. However, if the upward-inclination angle of the manifold is too small, the upward-inclination effect of the manifold (that is, uniform distribution of air to each diffuser) may be too low. In contrast, if the upward-inclination angle of the manifold is too large, the air may be excessively concentrated on the distal end of the manifold. In this regard, preferably, the upward-inclination angle of the manifold may be about 0.5° to about 1°.

According to another embodiment of the diffuser module of the present invention, the diffuser comprises at least one air feeding port and an air bubble discharge wall having a plurality of air bubble discharge holes, in which the air bubble discharge wall is inclined upward in the direction of increasing distance relative to the air feeding port. According to this embodiment, the air can be uniformly fed into the plural diffusers, which are fluid-communicated with the air outlet ports of the manifold, and the air bubbles can be uniformly discharged from the air bubble discharge holes of the diffusers. That is, the formation of the dead zone diffuser and the dead zone air bubble discharge holes can be prevented. For instance, this embodiment can be realized by using the diffuser pair shown in FIGS. 4 and 5, instead of the diffuser 100-3 shown in FIG. 6. Since the details of the diffuser used in the diffuser module of the present invention have already been described above, it will not be further described below.

According to another aspect of the present invention, there is provided a diffuser module which comprises a tube manifold having at least one air intake port and a plurality of air outlet ports which are intermittently formed in an air flow direction, the tube manifold is inclined upward relative to a horizontal plane in the air flow direction; and a plurality of diffusers which are fluid-communicated with the air outlet ports of the manifold, wherein the diffusers have an air bubble discharge pipe comprising an air feeding port; and an air bubble discharge wall having a plurality of air bubble discharge holes, the air bubble discharge wall is inclined upward in the direction of increasing distance relative to the air feeding port; and a sludge discharge pipe which is installed at a distal end of the air bubble discharge pipe, the sludge discharge pipe extends downward.

Another problem frequently occurring in relation to an diffuser is sludge deposition in the diffuser. Even an diffuser that does not undergo the non-uniform aeration phenomenon in its initial stage of operation, when air bubble discharge holes are blocked by sludge deposited in the diffuser during its long-term operation, eventually undergoes the non-uniform aeration phenomenon. In this case, all sludge in an aerobic tank must be emptied, and the diffuser must be repaired or replaced. Such frequent replacement of diffusers is cumbersome, and increases cost and time for maintenance. Also, replacement of diffusers requires the water treatment facility operation to be stopped, thereby, the treatment of sewage that is continuously flowing into the facility to be stopped.

A blockage of an diffuser occurs due to congestion, fixation and deposition of sludge which flows into the diffuser. As the sludge deposition proceeds in the diffuser, a passage in the diffuser is blocked, and, air discharge holes of the diffuser are also blocked. Therefore, it is preferable that the diffuser has a structure capable of effectively minimizing the sludge congestion and easily discharging the congested sludge.

As an comparative example of technology for preventing a blockage of an diffuser due to sludge, forming a sludge discharge hole in a lower wall of a pipe-type diffuser may be considered. Wherein, the sludge discharge hole is larger than an air bubble discharge hole which is generally formed in an upper wall of the diffuser, and sludge is naturally discharged through the sludge discharge hole. In this case, as the sludge discharge hole is closer to an air feed part, the sludge discharge effect increases, but a possibility of an air outflow through the sludge discharge hole increases. Also, since the congestion of sludge around a distal end of the diffuser may not be relieved, a possibility of a blockage of the distal end of the diffuser increases. Alternatively, a plurality of sludge discharge holes may be formed at several positions. However, this further increases a possibility of air outflow through the sludge discharge holes. When considering these points, the sludge discharge hole may be preferably located in a lower wall of the distal end of the diffuser.

However, in case that the sludge discharge hole is located in the lower wall of the distal end of the diffuser, when an amount of air flow increases, an air layer profile in the diffuser may contact the sludge discharge hole, thereby generating an air outflow through the sludge discharge hole. In general, the sludge discharge hole has a larger size than an air bubble discharge hole and has a relatively lower resistance against passing air flow. Therefore, if the air layer profile in the diffuser contacts the sludge discharge hole, the sludge discharge hole easily discharges a larger amount of air than the air bubble discharge hole. Accordingly, uniform aeration through the air bubble discharge holes is hindered, and a desired amount of air bubbles through the air bubble discharge holes can not be obtained.

If the diffuser having the sludge discharge hole in the lower wall of the distal end thereof is installed to deviate upward from a design value, this phenomenon becomes serious. The upwardly deviated installation of the diffuser from the design value means that the distal end of the diffuser is raised up above the design value. In this case, the air layer profile in the diffuser more easily contacts the sludge discharge hole.

However, in the present invention, the diffuser may prevent sludge from being deposited in the diffuser during the normal operation of aeration, and may remove sludge deposited in the diffuser only through a simple cleaning work after the diffuser is blocked. Therefore, the diffuser in the present invention may effectively solve problems such as inconvenience, cost, work time, and a stoppage of operation of a water treatment facility which are caused by frequent repair or replacement of the diffuser performed for removing the sludge deposited in the diffuser.

The diffuser used in the present invention can easily discharge sludge through the sludge discharge pipe. And, in the diffuser of the present invention, an air outflow through the sludge discharge pipe can be effectively prevented since the sludge discharge pipe extends downward. Thereby, uniformity of occurrence of air bubbles through air bubble discharge holes can be secured.

Figure 8:
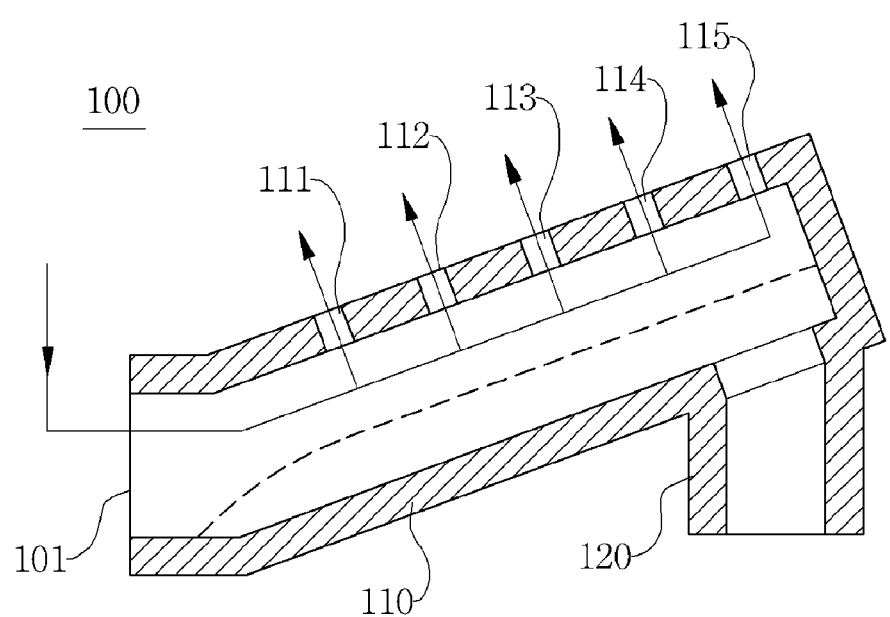
FIG. 8 is a cross-sectional view of an diffuser used in another embodiment of a diffuser module according to the present invention, the diffuser having a sludge discharge pipe which extends downward.

FIG. 8 is a cross-sectional view of an diffuser used in the diffuser module according to the present invention. Referring to FIG. 8, the diffuser 100 includes an air bubble discharge pipe 110 and a sludge discharge pipe 120. An air feeding port 101 and a plurality of air bubble discharge holes 111, 112, 113, 114, and 115 are formed in the air bubble discharge pipe 110. An upper wall of the air bubble discharge pipe 110 in which the air bubble discharge holes 111, 112, 113, 114, and 115 are formed forms an air bubble discharge wall. The air bubble discharge pipe 110 is inclined upward in the direction of increasing distance relative to the air feeding port 101. Therefore, as the air bubble discharge wall is far away from the air feeding port 101, the air bubble discharge wall is inclined upwards. A distal end of the air bubble discharge pipe 110 is opposite to the air feeding port 101. The sludge discharge pipe 120 is located at the distal end of the air bubble discharge pipe 110. And, the sludge discharge pipe 120 is in fluid-connection with the air bubble discharge pipe 110. The sludge discharge pipe 120 extends downward.

During aeration, air flows into the air bubble discharge pipe 110 through the air feeding port 101, and then is discharged in the form of air bubble through the air bubble discharge holes 111, 112, 113, 114, and 115. A flow of the air in the air bubble discharge pipe 110 is indicated by arrows. In the air bubble discharge pipe 110, an area above a dash line is an air layer, and an area under the dash line is a water layer. The upper wall of the air bubble discharge pipe 110 in which the air bubble discharge holes 111, 112, 113, 114, and 115 are formed, i.e., the air bubble discharge wall, is inclined upward away from the air feeding port 101. In this structure, a fed amount of air and a buoyancy of the air layer act as important factors in a process of forming the air layer. Therefore, the air layer (the area above the dash line) in the air bubble discharge pipe 110 may naturally and easily extend up to the distal end of the air bubble discharge pipe 110 by aid of the buoyancy that acts on the air layer through the water layer. The air layer may have a relative uniform thickness throughout an entire area of the air bubble discharge wall. Thus, the amount of air bubbles discharged from each of the air bubble discharge holes 111, 112, 113, 114, and 115 is relatively uniformly distributed. Therefore, since the air layer easily extends up to the distal end of the air bubble discharge pipe 110, although a fed amount of air flowing into the air feeding port 101 is relatively small, a dead zone air bubble discharge hole may not be caused at all or may be extremely hindered from being caused, wherein the dead zone air bubble discharge hole means an air bubble discharge hole which does not discharge air bubbles at all or discharges an insufficient amount of air bubbles for physical cleaning.

During aeration or during a halt of aeration, sludge of wastewater flows into the air bubble discharge pipe 110. Some parts of the sludge that has flowed into the air bubble discharge pipe 110 is pushed out by a feeding air pressure, but other parts of the sludge remains in a lower part of the inside of the air bubble discharge pipe 110. The remaining sludge contacts air of the air layer and gradually grows into a gel form in a dried state or a semi-dried state. If a size of the remaining sludge is small, the remaining sludge may be easily discharged out of the air bubble discharge pipe 110 by air stream and water stream without sticking to the inside of the air bubble discharge pipe 110. However, a lump of sludge having a size greater than a predetermined size (i.e., greater than an air bubble discharge hole) fails to be discharged, thereby being a nucleus for further growth of the sludge lump, eventually blocking the air bubble discharge holes and subsequently the diffuser.

In the present invention, however, the sludge is not fixed in the air bubble discharge pipe 110 due to the disturbance of the water layer in the air bubble discharge pipe 110, and thus is discharged out of the air bubble discharge pipe 110 through the sludge discharge pipe 120. In the case of a conventional horizontal diffuser, since an air profile becomes thinner toward an distal end of the horizontal diffuser, the driving force for pushing out the sludge at the distal end of the horizontal diffuser is deficient. In the present invention, since the air profile in the air bubble discharge pipe 110 is easily formed up to a position of the sludge discharge pipe 120, the sludge that has flowed into the lower part of the air bubble discharge pipe 110 can be smoothly discharged through the sludge discharge pipe 120.

Figure 9:
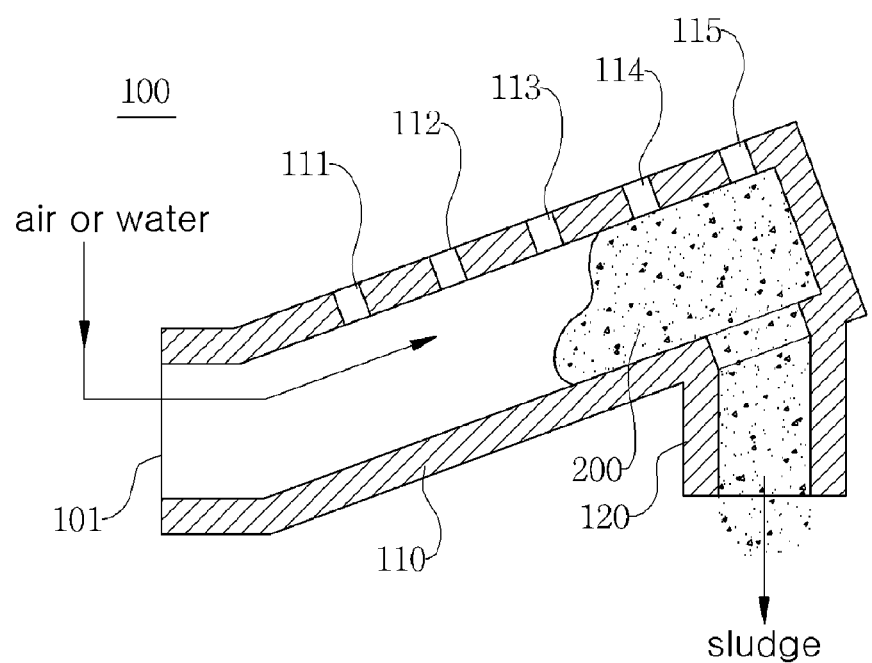
FIG. 9 is a cross-sectional view illustrating a process of cleaning the diffuser of FIG. 8 that is blocked.

FIG. 9 is a cross-sectional view illustrating a process of cleaning the diffuser 100 of FIG. 8 that is blocked. If an air blower that feeds air into the diffuser 100 breaks down or the aeration tank is discontinuously driven, the diffuser 100 may be blocked by fixation and deposition of the sludge flowing in the diffuser 100. Even in this case, in the present invention, an excessive amount of air or an excessive amount of water is fed into the diffuser 100 so as to discharge the sludge deposited in the diffuser 100 through the sludge discharge pipe 120. Referring to FIG. 9, if an excessive amount of air or water is fed into the diffuser 100 through the air feeding port 101, sludge 200 deposited in the air bubble discharge pipe 110 is pushed toward the distal end of the air bubble discharge pipe 110. The sludge 200 pushed toward the distal end of the air bubble discharge pipe 110 is discharged through the sludge discharge pipe 120. Compared to the cleaning by using air, when water is used to clean the diffuser 100, maximum outflow amounts of water through the air bubble discharge holes 111, 112, 113, 114, and 115 are relatively limited. Therefore, compared to the cleaning by using air, an excessive amount of cleaning water may further effectively push the sludge 200 out of the air bubble discharge pipe 100.

As described above, an diffuser of the present invention may prevent sludge from being deposited in the diffuser during normal operation of aeration, and may remove the sludge deposited in the diffuser only through a simple cleaning work after the diffuser is blocked. Therefore, the diffuser of the present invention may solve problems of inconvenience, cost, work time, and a stoppage of driving of a water treatment facility caused by frequent repairs or replacements of the diffuser.

Figure 10:
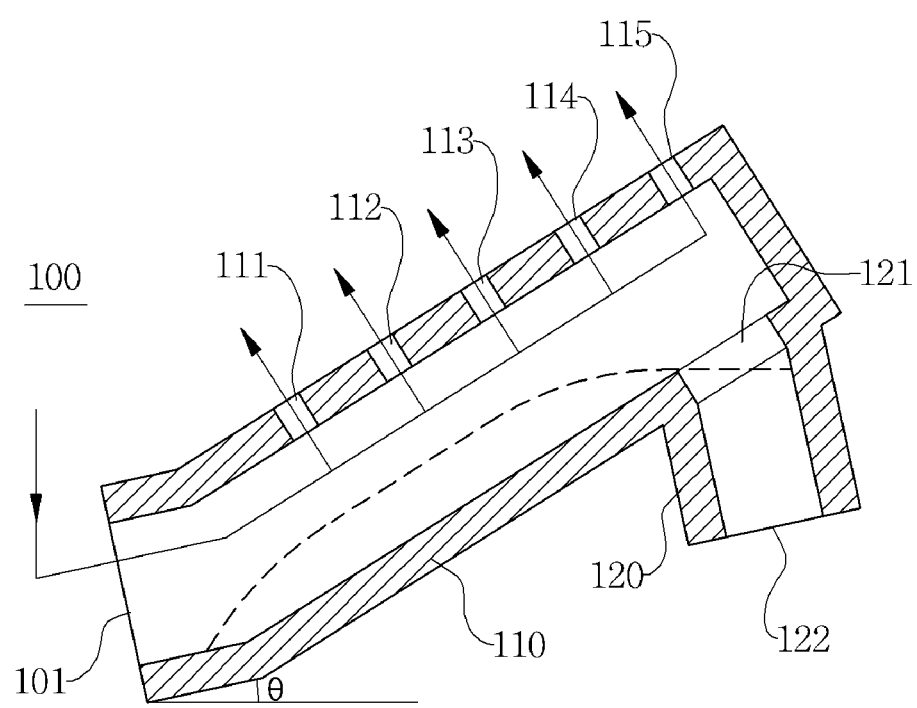
FIG. 10 is a cross-sectional view illustrating the diffuser of FIG. 8 that deviates from a design value.

FIG. 10 is a cross-sectional view illustrating the diffuser 100 of FIG. 8 that is installed to deviate from a design value. Referring to FIG. 10, the distal end of the air bubble discharge pipe 110 is raised up above the design value (wherein θ is a rise deviation angle of the air bubble discharge pipe 110). Thus, an air profile indicated by a dash line contacts an entrance 121 of the sludge discharge pipe 120. In other words, the air layer (the area above the dash line) is fluid-connected to the sludge discharge pipe 120. However, since the sludge discharge pipe 120 is extended downward, an exit 122 of the sludge discharge pipe 120 can be still blocked by the water layer. In other words, although the distal end of the air bubble discharge pipe 110 is raised up above the design value, since the sludge discharge pipe 120 is extended downward, the exit 122 of the sludge discharge pipe 120 is maintained horizontally lower than the air bubble discharge holes 111, 112, 113, 114, and 115, in particular, than the air bubble discharge hole 111 adjacent to the air feeding port 101. Therefore, a higher hydraulic pressure acts on the exit 122 of the sludge discharge pipe 120 than on the air bubble discharge holes 111, 112, 113, 114, and 115. Accordingly, although the air layer (the area above the dash line) in the air bubble discharge pipe 110 is connected to the sludge discharge pipe 120, an air outflow through the exit 122 of the sludge discharge pipe 120 may be hindered.

Accordingly, an diffuser of the present invention has a high tolerance to an upwardly deviated installation from a design value. An upward inclination effect of the air bubble discharge wall is to prevent a watertight phenomenon of air bubble discharge holes which will be caused by a downwardly deviated installation from a design value. Therefore, the diffuser of the present invention exhibits a tolerance to the upward deviation installation from the design value and a tolerance to the downward deviation installation from the design value.

Figure 11:
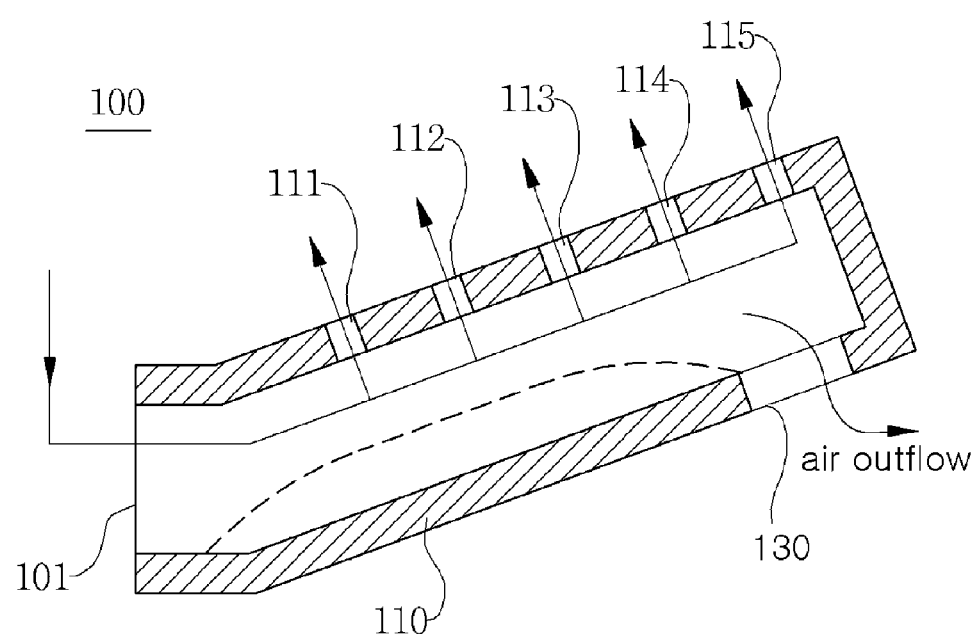
FIG. 11 is a cross-sectional view illustrating a comparative diffuser including a sludge discharge hole in a lower wall of a distal end of an air bubble discharge pipe.

In an comparative diffuser wherein only a sludge discharge hole is formed in a lower wall of a distal end thereof, if an air pressure of an air layer in an air bubble discharge pipe increases (e.g., when an amount of aeration increases, a larger amount of air must be fed into an air feeding port, and thus the air pressure of the air layer in the air bubble discharge pipe increases), a possibility of an air outflow through the sludge discharge hole greatly increases. Referring to FIG. 11, if the air bubble discharge pipe 110 is inclined upwards, and an air pressure of the air layer in the air bubble discharge pipe 110 increases, then an air profile contacts a sludge discharge hole 130 that is formed in a lower wall of a distal end of the air bubble discharge pipe 110. Thereby, a possibility of an air outflow through the sludge discharge hole 130 further increases. However, as shown in FIG. 10, in the diffuser 100 of the present invention, the increased hydraulic pressure acts on the exit 122 of the sludge discharge pipe 120 that extends downward. Thus, although the air pressure of the air layer in the air bubble discharge pipe 110 increases, the outflow of the air through the exit 122 of the sludge discharge pipe 120 may continue to be hindered. In other words, since the sludge discharge pipe 120 that extends downward serves as a kind of pressure valve, even when the air pressure of the air layer in the air bubble discharge pipe 110 increases, the outflow of the air through the sludge discharge pipe 120 is prevented.

As described above, an diffuser of the present invention may easily discharge sludge through a sludge discharge pipe, and may effectively prevent an air outflow through the sludge discharge pipe that extends downward. Therefore, uniformity of occurrence of air bubbles through air bubble discharge holes may be secured.

A length of the sludge discharge pipe that extends downward may be appropriately determined in consideration of an upward inclination angle of the air bubble discharge pipe and aeration conditions (an amount of aeration flow, a pressure of an air layer, etc.). For example, the length of the sludge discharge pipe may be simply determined so that the position of its exit is deeper than positions of the air bubble discharge holes. For example, the length of the sludge discharge pipe may be determined according to the amount of aeration flow, a feeding pressure of air, the depth of water, liquid viscosity, and the number of diffuser units that are connected to one another. If the length of the sludge discharge pipe is too short, the effect of preventing the air outflow may be meager. If the length of the sludge discharge pipe is too long, the sludge may not be easily discharged. For example, the length of the sludge discharge pipe may be between about 30 mm and about 100 mm.

In the diffuser installation structure according to the present invention, the diffuser for aeration is inclined upward so that an air layer formed in the diffuser for aeration can extend to the distal end of the diffuser for aeration, which is located far away from the air feeding port. Thus, even if a relatively smaller amount of air is fed into the diffuser for aeration, the air bubble discharge holes located in the vicinity of the distal end of the diffuser for aeration can discharge air bubbles sufficient for preventing the formation of dead zone. In addition, the air bubbles can be uniformly discharged from the plural air bubble discharge holes. Further, the diffuser installation structure according to the present invention has a superior tolerance against design deviation. In the diffuser module for aeration according to the present invention, a manifold that distributes air into a plurality of diffusers is inclined upward in the air flow direction. Thus, air can be uniformly distributed into the diffusers, which are fluid-communicated with air outlet ports of the manifold.

EXAMPLES

Fabrication of a Diffuser Module

Figure 7:
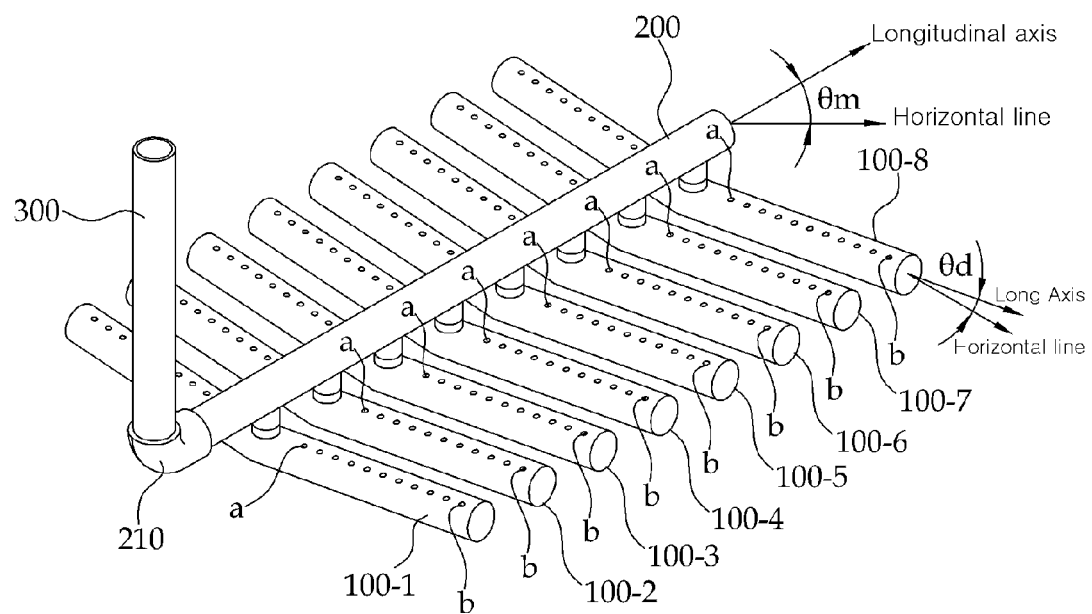
FIG. 7 is a perspective view illustrating a diffuser module for aeration according to an embodiment of the present invention.

In order to verify the effect of the diffuser installation structure according to the present invention against the non-uniform aeration, the diffuser module having a size suitable for the water treatment facility was fabricated as shown in FIG. 7.

FIG. 7 is a perspective view illustrating the diffuser module for aeration which was fabricated in this fabrication example. Eight pairs of circular tube type diffusers 100-1, 100-2, 100-3, 100-4, 100-5, 100-6, 100-7, and 100-8 (which are similar to the pair of diffusers shown in FIG. 4) are fluid-communicated with the circular tube type manifold 200. The fluid communication between the manifold and the diffusers is achieved through short tubes welded therebetween. The inner diameter of the manifold 200 is 50 mm, the length of the manifold 200 is 1450 mm, and the distal end of the manifold 200, which is opposite to the air intake port, is closed. The left and right diffusers of each diffuser pair have inner diameters of 25 mm and lengths of 440 mm, respectively. Both ends of each diffuser pair are closed. Each diffuser is formed at an upper portion thereof with eight air bubble discharge holes having a diameter of 5 mm. In each diffuser, the air discharge hole, which is closest to the air feeding port, is denoted as "a" and the air discharge hole located farmost away from the air feeding port is denoted as "b".

In the eight pairs of diffusers 100-1, 100-2, 100-3, 100-4, 100-5, 100-6, 100-7, and 100-8, the upward-inclination angle of the air bubble discharge wall is identical to an inclination angle $\theta d$ between the central longitudinal axis of the diffuser and the horizontal plane. In addition, the upward-inclination angle of the manifold 200 is identical to an inclination angle $\theta m$ between the central longitudinal axis of the manifold 200 and the horizontal plane.

In this fabrication example, six diffuser modules including air bubble discharge walls having the upward-inclination angles $\theta d$ of $-3°$, $0°$, $3°$, $7°$, $10°$, and $15°$, respectively, were fabricated. The negative angle represents the downward inclination. In each diffuser module, an air feeding pipe 300 is connected with the air intake port of the manifold 200 through an elbow 210 for fluid communication.

Installation of Diffuser Modules

The above diffuser modules were alternately mounted on the bottom of a test reservoir (length 2500 mm, width 1500 mm, and height 3800 mm). The upward-inclination angle $\theta m$ of the manifold 200 was determined by adjusting the height of a fixing clamp used for fixing the ends of the manifold 200.

Aeration Test

The depth of water in the test reservoir was maintained at 3 m. An air pump installed outside the test reservoir was fluid-connected with the air feeding pipe 300 to supply air to the air feeding pipe 300. The amount of air supplied into the air feeding pipe 300 was 75 $m^3$/hr (designed flow rate). The amount of air bubbles discharged from the diffuser was obtained by measuring the volume of the air bubbles discharged from the air bubble discharge holes "a" and "b" of each diffuser, using an air collecting device and a flow meter.

Upward-Inclination Effect of Diffusers

In order to verify the upward-inclination effect of diffusers against the non-uniform aeration, the amount of air bubbles discharged from the diffusers having the air bubble discharge wall having the inclination angles $\theta d$ of $3°$, $7°$, $10°$, and $15°$ was measured in experimental examples 1 to 4, respectively. In addition, the amount of air bubbles discharged from the diffusers having the air bubble discharge wall having the inclination angles $\theta d$ of $-3°$ and $0°$ was measured in comparative examples 1 and 2, respectively. In experimental examples 1 to 4 and comparative examples 1 and 2, the diffuser module was installed such that the upward-inclination angle $\theta m$ of the manifold 200 is set to $0°$. Experimental examples 1 to 4 and comparative examples 1 and 2 were performed under the same depth of water in the test reservoir and the same amount of air supplied to the air feeding pipe. The measurement result obtained from experimental examples 1 to 4 and comparative examples 1 and 2 is shown in Table 1.

TABLE 1

| | | | Amount of air bubbles discharged from diffuser(m³/hr) | | | | | | | | |
|---|---|---|---|---|---|---|---|---|---|---|---|
| | θd(°) | Hole | 100-1 | 100-2 | 100-3 | 100-4 | 100-5 | 100-6 | 100-7 | 100-8 | Sum |
| Experimental Example 1 | 3 | a | 0.86 | 0.81 | 0.65 | 0.64 | 0.66 | 0.47 | 0.36 | 0.20 | 4.65 |
| | | b | 0.78 | 0.63 | 0.58 | 0.56 | 0.43 | 0.28 | 0.16 | 0.05 | 3.47 |
| Experimental Example 2 | 7 | a | 0.72 | 0.71 | 0.65 | 0.61 | 0.50 | 0.42 | 0.31 | 0.35 | 4.27 |
| | | b | 0.74 | 0.69 | 0.58 | 0.65 | 0.56 | 0.43 | 0.39 | 0.25 | 4.29 |
| Experimental Example 3 | 10 | a | 0.76 | 0.66 | 0.63 | 0.51 | 0.36 | 0.33 | 0.11 | 0 | 3.36 |
| | | b | 0.90 | 0.87 | 0.85 | 0.67 | 0.63 | 0.52 | 0.31 | 0.15 | 4.90 |
| Experimental Example 4 | 15 | a | 0.66 | 0.42 | 0.25 | 0.15 | 0.03 | 0 | 0 | 0 | 1.51 |
| | | b | 1.06 | 0.85 | 0.88 | 0.62 | 0.60 | 0.55 | 0.28 | 0.22 | 5.06 |
| Comparative Example 1 | −3 | a | 1.18 | 1.06 | 0.80 | 0.86 | 0.80 | 0.58 | 0.55 | 0.36 | 6.19 |
| | | b | 0.46 | 0.31 | 0.05 | 0 | 0 | 0 | 0 | 0 | 0.82 |
| Comparative Example 2 | 0 | a | 0.93 | 0.88 | 0.82 | 0.71 | 0.74 | 0.58 | 0.42 | 0.28 | 5.36 |
| | | b | 0.82 | 0.61 | 0.58 | 0.45 | 0.37 | 0.15 | 0 | 0 | 2.98 |

Figure 1:
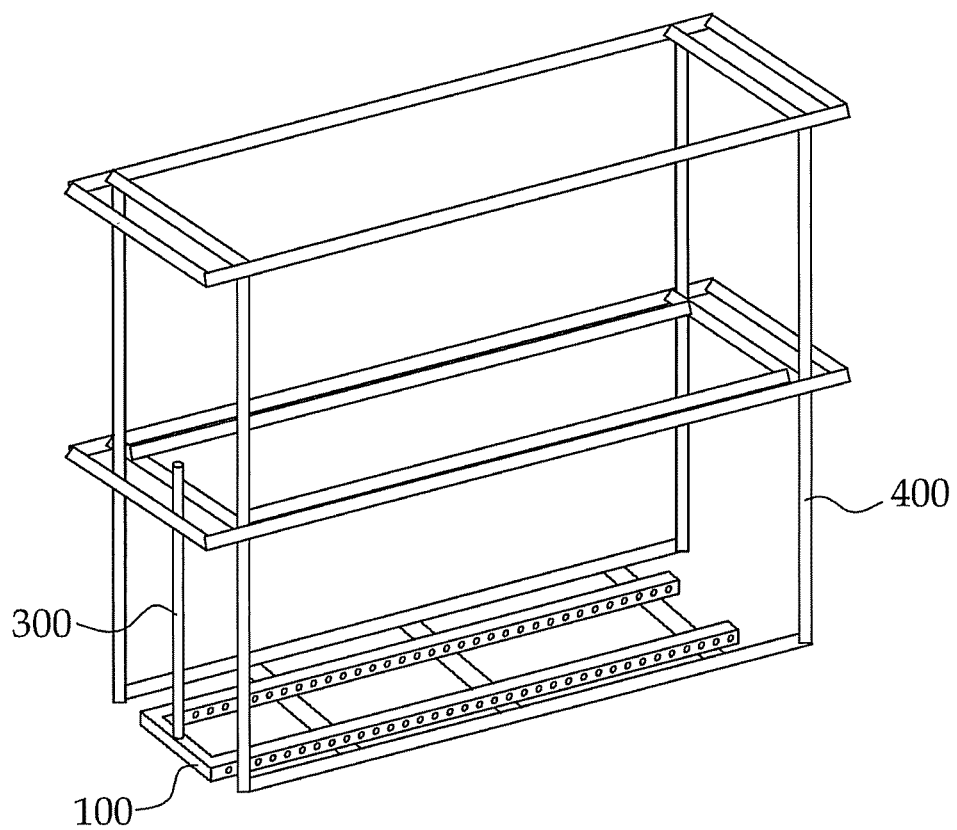
FIG. 1 is a perspective view illustrating the conventional diffuser installation structure, in which a membrane module fixing frame is integrally formed with a diffuser for aeration.

In each diffuser, "a" is an air bubble discharge hole which is closest to the air feeding port, and "b" is an air bubble discharge hole located farmost away from the air feeding port. As the difference between amounts of air bubbles discharged from the air bubble discharge holes "a" and "b" becomes smaller, the diffuser represents the superior effect against the non-uniform aeration phenomenon. Accordingly, the important point, which is worthy of notice in Table 1, is the tendency of difference between amounts of air bubbles discharged from the air bubble discharge holes "a" and "b" in the same diffuser according to the inclination angles θd of the air bubble discharge wall. In order to clearly understand such a tendency, the non-uniform aeration index (NAI) is defined as expressed in Equation 1, and the non-uniform aeration index for each diffuser is calculated based on air bubble measurement data shown in Table 1. The result is shown in Table 2.

$$NAI(\%) = \frac{|a-b|}{\max(a,b)} 100 \qquad \text{Math Figure 1}$$

In Equation 1, |a−b| is an absolute value of difference between amounts of air bubbles discharged from the air bubble discharge holes "a" and "b", and max(a,b) represents the greater one between amounts of air bubbles generated from air bubble discharge holes "a" and "b".

As shown in Table 2, in the case of experimental examples 1 and 2 in which the air bubble discharge walls have the upward-inclination angles of 3° and 7°, respectively, the non-uniform aeration index (NAI) is significantly reduced in all diffusers as compared with that of comparative examples 1 and 2 in which the air bubble discharge walls have the upward-inclination angles of −3° and 0°, respectively. In the case of experimental example 3 in which the air bubble discharge wall has the upward-inclination angles of 10°, the non-uniform aeration index (NAI) is significantly reduced in most diffusers, except for the diffuser 100-8, as compared with that of comparative example 2 in which the air bubble discharge wall has the upward-inclination angles of 0°. It can be understood from the above result that the non-uniform aeration phenomenon of the diffuser is greatly improved if the air bubble discharge wall has the upward-inclination angle. In the case of comparative example 1 in which the air bubble discharge wall has the upward-inclination angles of −3°, the number of diffusers having the non-uniform aeration index of 100, that is, the number of diffusers having air bubble discharge holes that do not discharge air bubbles is remarkably increased. Therefore, it can be understood that bad influence is exerted upon the air distribution in the diffuser when the air bubble discharge wall has the downward-inclination angle even if the downward-inclination angle is very small.

In order to clearly understand the restriction effect for the non-uniform aeration according to variation of the upward-inclination angles, data of the diffuser 100-2 are extracted from Table 2. These data are shown in Table 3.

TABLE 2

| | | NAI (%) | | | | | | | |
|---|---|---|---|---|---|---|---|---|---|
| | θd(°) | 100-1 | 100-2 | 100-3 | 100-4 | 100-5 | 100-6 | 100-7 | 100-8 |
| Experimental Example 1 | 3 | 9.30 | 22.22 | 10.77 | 12.50 | 34.85 | 40.43 | 55.56 | 75.00 |
| Experimental Example 2 | 7 | 2.70 | 2.82 | 10.77 | 6.15 | 10.71 | 2.33 | 20.51 | 28.57 |
| Experimental Example 3 | 10 | 15.56 | 24.14 | 25.88 | 23.88 | 42.86 | 36.54 | 64.52 | 100 |
| Experimental Example 4 | 15 | 37.74 | 50.59 | 71.59 | 75.81 | 95.00 | 100 | 100 | 100 |
| Comparative Example 1 | −3 | 61.02 | 70.75 | 93.75 | 100 | 100 | 100 | 100 | 100 |
| Comparative Example 2 | 0 | 11.83 | 30.68 | 29.27 | 36.62 | 50.00 | 74.14 | 100 | 100 |

TABLE 3

| | Comparative Example 1 | Comparative Example 2 | Experimental Example 1 | Experi-mental Example 2 | Experi-mental Example 3 | Experi-mental Example 4 |
|---|---|---|---|---|---|---|
| θd (°) | −3 | 0 | 3 | 7 | 10 | 15 |
| NAI(%) | 70.75 | 30.68 | 22.22 | 2.82 | 24.14 | 50.59 |

As shown in Table 3, as the upward-inclination angle of the air bubble discharge wall of the diffuser increases from −3° to 7°, the non-uniform aeration index of the diffuser 100-2 is significantly reduced. In addition, experimental example 2, in which the air bubble discharge wall has the upward-inclination angle of 7°, represents the lowest non-uniform aeration index. The important point, which is worthy of notice in Table 3, is that the non-uniform aeration index of the diffuser 100-2 is increased again as the upward-inclination angle of the air bubble discharge wall of the diffuser increases from 7° to 15°. When the air bubble discharge wall has the upward-inclination angle of 10°, the non-uniform aeration index (NAI) is still remarkably reduced as compared with that of comparative examples 1 and 2 in which the upward-inclination angle is not applied. However, when the air bubble discharge wall has the upward-inclination angle of 15°, the non-uniform aeration index is lower than that of comparative example 1, in which the downward-inclination angle is applied, but is higher than that of comparative example 2, in which the upward-inclination angle is not applied. It can be understood from the above fact that the restriction effect for the non-uniform aeration is lowered, if the air bubble discharge wall of the diffuser has the excessively high upward-inclination angle. This is because the air bubbles are excessively concentrated on the air bubble discharge holes located at the distal end of the diffuser when the air bubble discharge wall of the diffuser has the excessively high upward-inclination angle. As can be understood from Table 1, in experimental example 3 (upward-inclination angle is 10°) and experimental example 4 (upward-inclination angle is 15°), the amount of air bubbles discharged from the air discharge hole "b" is greater than the amount of air bubbles discharged from the air discharge hole "a" in all diffusers, and the difference between amounts of air bubbles discharged from the air bubble discharge holes "a" and "b" is excessively increased when the upward-inclination angle is 15°.

Based on the variation tendency in the non-uniform aeration index (NAI) of the diffuser according to the upward-inclination angle of the diffuser, the upward-inclination angle can be optimally set in such a manner that the amount of air bubbles discharged from the air bubble discharge hole "a", which is closest to the air feeding port, can be substantially identical to the amount of air bubbles discharged from the air bubble discharge hole "b" located farmost away from the air feeding port.

Upward-Inclination Effect of Manifold

In order to verify the restriction effect for the non-uniform aeration according to the upward-inclination of the manifold, in experimental examples 5 and 6, the diffuser module was installed such that the upward-inclination angle θm of the manifold is 0.5° and 1°, respectively, and, the amount of air bubbles was measured. In addition, the amount of air bubbles was measured in comparative example 3 by installing the diffuser module such that the upward-inclination angle θm of the manifold is set to 0°. In experimental examples 5 and 6 and comparative example 3, the air bubble discharge walls of all diffusers have the same upward-inclination angle of 7°. In addition, experimental examples 5 to 6 and comparative example 3 were performed under the same depth of water in the test reservoir and the same amount of air supplied to the air feeding pipe. The measurement result obtained from experimental examples 5 to 6 and comparative example 3 is shown in Table 4. Data of comparative example 3 is identical to that of experimental example 2.

TABLE 4

| | | | Amount of air bubbles discharged from diffuser(m³/hr) | | | | | | | | |
|---|---|---|---|---|---|---|---|---|---|---|---|
| | θd(°) | Hole | 100-1 | 100-2 | 100-3 | 100-4 | 100-5 | 100-6 | 100-7 | 100-8 | Sum |
| Experimental Example 5 | 0.5 | a | 0.63 | 0.58 | 0.55 | 0.62 | 0.60 | 0.51 | 0.50 | 0.48 | 4.47 |
| | | b | 0.57 | 0.52 | 0.60 | 0.55 | 0.56 | 0.48 | 0.50 | 0.45 | 4.23 |
| Experimental Example 6 | 1.0 | a | 0.33 | 0.42 | 0.40 | 0.47 | 0.55 | 0.61 | 0.72 | 0.68 | 4.18 |
| | | b | 0.36 | 0.35 | 0.45 | 0.49 | 0.52 | 0.71 | 0.68 | 0.73 | 4.29 |
| Comparative Example 3 | 0 | a | 0.72 | 0.71 | 0.65 | 0.61 | 0.50 | 0.42 | 0.31 | 0.35 | 4.27 |
| | | b | 0.74 | 0.69 | 0.58 | 0.65 | 0.56 | 0.43 | 0.39 | 0.25 | 4.29 |

The restriction effect for the non-uniform aeration according to the upward-inclination of the manifold can be determined based on uniformity of air distribution to diffusers which are fluid-communicated with the manifold. In Table 4, the diffusers have the higher sequence number as the fluid connection position thereof is located farther away from the air intake port. That is, the diffuser 100-1 is fluid-connected with the air outlet port which is closest to the air intake port of the manifold, and the diffuser 100-8 is fluid-connected with the air outlet port located farmost away from the air intake port of the manifold. In evaluation of the restriction effect for the non-uniform aeration according to the upward-inclination of the manifold, it is not quite proper to compare the total amount of air supplied to the diffuser 100-1 with the total amount of air supplied to the diffuser 100-8. Instead, it is preferred in terms of effectiveness to compare the amount of air bubbles discharged from the air bubble discharge hole "a" of the diffuser 100-1 with the amount of air bubbles discharged from the air bubble discharge hole "a" of the diffuser 100-8, and then compare the amount of air bubbles discharged from the air bubble discharge hole "b" of the diffuser 100-1 with the amount of air bubbles discharged from the air bubble discharge hole "b" of the diffuser 100-8. This is because the technical object of the present invention is to improve uniformity of air bubbles discharged from all air bubble discharge holes of all diffusers. In this regard, the manifold non-uniform aeration index (MNAI) is defined as expressed in Equation 2. And, based on data in Table 4, the variation of the manifold non-uniform aeration index (MNAI) according to the upward-inclination angle θm of the manifold is shown in Table 5.

$$MNAI\text{-}a(\%) = \frac{|a_{[100-1]} - a_{[100-8]}|}{\max(a_{[100-1]}, a_{[100-8]})} 100$$

$$MNAI\text{-}b(\%) = \frac{|b_{[100-1]} - b_{[100-8]}|}{\max(b_{[100-1]}, b_{[100-8]})} 100$$

Figure 2:
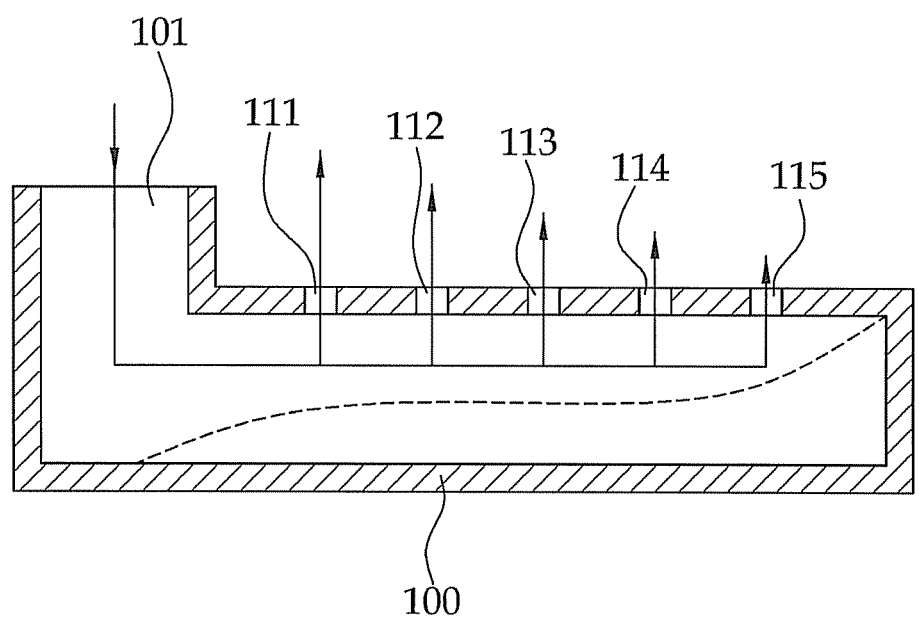
FIG. 2 is an enlarged sectional view showing a part of the diffuser for aeration illustrated in FIG. 1.
Figure 3:
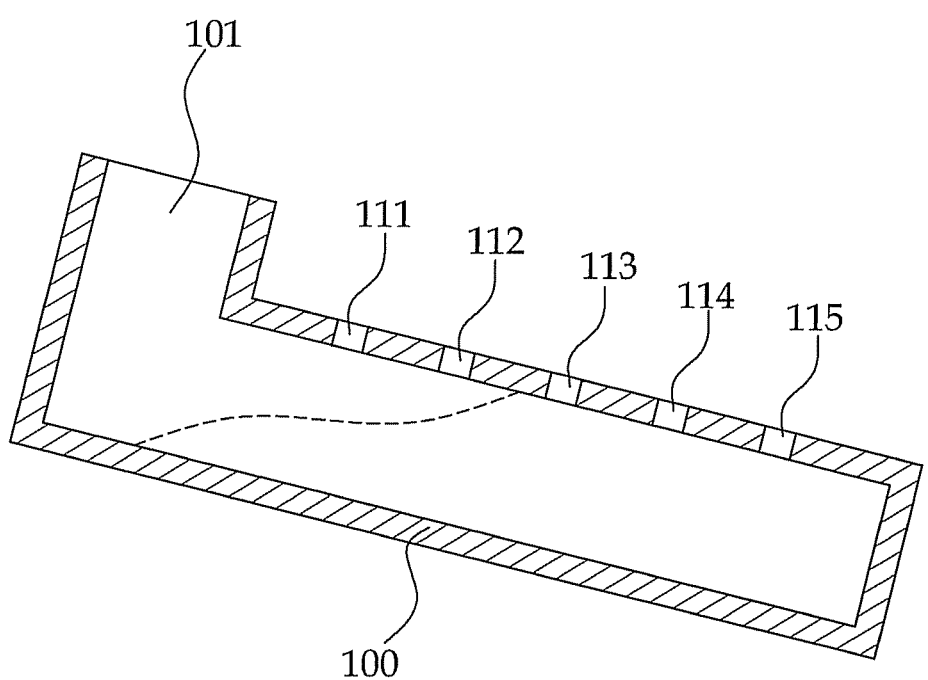
FIG. 3 is a sectional view showing the diffuser for aeration illustrated in FIG. 2, which is not kept in the horizontal state.

Math Figure 2

In Equation 2, a[100-1] is an amount of air bubbles discharged from the air bubble discharge hole "a" of the diffuser 100-1, a[100-8] is an amount of air bubbles discharged from the air bubble discharge hole "a" of the diffuser 100-8, b[100-1] is an amount of air bubbles discharged from the air bubble discharge hole "b" of the diffuser 100-1, and b[100-8] is an amount of air bubbles discharged from the air bubble discharge hole "b" of the diffuser 100-8.

TABLE 5

| | θd (°) | MNAI-a (%) | MNAI-b (%) |
|---|---|---|---|
| Comparative Example 3 | 0 | 51.39 | 66.22 |
| Experimental Example 5 | 0.5 | 23.81 | 21.05 |
| Experimental Example 6 | 1 | 51.47 | 50.68 |

As shown in Table 5, as the upward-inclination angle of the manifold increases from 0° to 0.5°, the manifold non-uniform aeration indexes a and b (MNAI-a, MNAI-b) are significantly lowered. In addition, when the upward-inclination angle of the manifold is 1°, the manifold non-uniform aeration index b (MNAI-b) is remarkably lowered (from 66.22% to 50.68%) as compared with the case where the upward-inclination angle of the manifold is 0°. Accordingly, it can be understood that uniformity of air distribution to the diffusers, which are fluid-connected to the manifold, can be improved when the manifold has the upward-inclination angle.

In addition, it can be understood from data of experimental examples 5 and 6 that the manifold non-uniform aeration indexes a and b (MNAI-a, MNAI-b) are increased again as the upward-inclination angle of the manifold increases from 0.5° to 1°. That is, as shown in data of experimental example 6 in Table 4, if the manifold has an excessive upward-inclination angle, the air is concentrated on the diffuser located far away from the air intake port of the manifold, so the uniformity of air distribution to the diffusers may deteriorate.

In the Examples of the present invention employing the diffuser module shown in FIG. 6, the preferred upward-inclination angle of the air bubble discharge wall of the diffuser is about 7°, and the preferred upward-inclination angle of the manifold is about 0.5°. However, these numerical values may vary according to environmental parameters of the water treatment system to which the present invention is applied.

The diffuser for aeration of the present invention can be used to generate air bubbles, for instance, in the aeration tank of a water treatment facility, in the filtration tank of a water treatment facility using filtration, and in the bio-reactor of a water treatment facility using a membrane bio-reactor (MBR).

The invention claimed is:

1. A diffuser module comprising:
    a tube manifold having at least one air intake port and a plurality of air outlet ports which are intermittently formed in an air flow direction, the tube manifold being inclined upward relative to a horizontal plane in the air flow direction; and
    a plurality of diffusers which are fluid-communicated with the air outlet ports of the manifold,
    wherein the diffusers each include:
    an air bubble discharge pipe comprising an air feeding port; and an air bubble discharge wall having a plurality of air bubble discharge holes, the air bubble discharge wall being inclined upward in the direction of increasing distance relative to the air feeding port; and
    a sludge discharge pipe which is installed at a distal end of the air bubble discharge pipe, the sludge discharge pipe extending downward.

* * * * *